United States Patent [19]
Braitmaier

[11] Patent Number: 6,056,351
[45] Date of Patent: May 2, 2000

[54] BODY STRUCTURE FOR A MOTOR VEHICLE

[75] Inventor: Klaus Braitmaier, Herrenberg, Germany

[73] Assignee: DaimlerChrysler AG, Stuttgart, Germany

[21] Appl. No.: 09/406,131

[22] Filed: Sep. 27, 1999

[30] Foreign Application Priority Data

Sep. 26, 1998 [DE] Germany ............... 198 44 216

[51] Int. Cl.⁷ .................................. B60R 27/00
[52] U.S. Cl. .................. 296/189; 296/189; 296/188; 296/203.03
[58] Field of Search ................... 296/187, 188, 296/189, 191, 193, 203.01, 203.03

[56] References Cited

U.S. PATENT DOCUMENTS 3,848,886  11/1974  Feustel et al. .

FOREIGN PATENT DOCUMENTS

| 267-895 | 5/1988 | European Pat. Off. ........... 296/189 |
| 195 40 029 A1 | 3/1996 | Germany . |
| 196 12 019 A1 | 10/1997 | Germany . |
| 3-65475 | 3/1991 | Japan ..................................... 296/189 |
| 4-50083 | 2/1992 | Japan ..................................... 296/189 |

Primary Examiner—Dennis H. Pedder
Assistant Examiner—Mickki D. Murray
Attorney, Agent, or Firm—Evenson, McKeown, Edwards & Lenahan, P.L.L.C.

[57] ABSTRACT

In known motor vehicle body structures, jamming of side doors, which hinders attempts to rescue of vehicle occupants, may occur after a vehicle impact. According to the present invention, the outer shell of the movable vehicle body part is designed to be resistant to deformation and the pertaining inner shell is designed to be deformable at least in sections. In at least one flanking vehicle body section, in a correspondingly inverse manner, the outer shell is constructed so as to be deformable at least in sections, and the inner shell is constructed to be deformation resistant. This body structure is suitable for use, for example, in passenger cars.

19 Claims, 1 Drawing Sheet

BODY STRUCTURE FOR A MOTOR VEHICLE

This application claims the priority of German patent application 198 44 216.5-42, filed Sep. 26, 1998, the disclosure of which is expressly incorporated by reference herein.

BACKGROUND AND SUMMARY OF THE INVENTION

The present invention relates to a body structure for a motor vehicle having at least one movable vehicle body part which is arranged along an impact load direction as well as stationary vehicle body sections which flank the movable vehicle body part and are approximately aligned in the impact load direction in front of and behind the moveable body part. Each of the movable vehicle body parts and the flanking vehicle body sections is constructed of an outer shell and an inner shell which are aligned in the impact load direction.

Passenger cars with self-supporting body structures are generally known. At least two side doors, and normally in the case of a station wagon one swivellable tail gate, are assigned to the body structure of such a passenger car. The side doors and the tail gate represent movable vehicle body parts which are flanked by stationary vehicle body sections of the body structure, particularly by A-columns and B-columns or by rear columns. In the event of a strong vehicle impact acting in the longitudinal direction of the vehicle, that is, in the event of a frontal impact or a rear impact, there is a risk that the side doors may no longer be opened without difficulty. In such cases, it may be necessary to use cutting tools in a high-cost manner in order to rescue persons from the vehicle. Particularly, when vehicle occupants are seriously injured, valuable time will be lost because of such measures. A similar situation may arise when, after a side impact, the tail gate in a rear area of the motor vehicle can no longer be opened and vehicle occupants on a third seat bench in a cargo space of the station wagon may have to be rescued.

It is an object of the invention to provide a body structure of the initially mentioned type which permits a fast rescue of vehicle occupants in the event of a strong vehicle impact.

This object is achieved by designing the outer shell of the movable vehicle body part so that it is resistant to deformation and designing the pertaining inner shell so that it is deformable, at least in sections, viewed in the impact load direction, and by designing at least one flanking vehicle body section in a correspondingly inverse manner, namely, constructing the outer shell to be deformable at least in sections and the inner shell to be resistant to deformation. The movable vehicle body part, therefore, cannot be wedged in such a form-locking manner with the adjusting vehicle body sections that opening of the vehicle body part is no longer possible. The invention is based on a recognition that the difficulties when opening side doors deformed by a frontal impact or a rear impact are the result of a form-locking wedging, particularly in the door lock area between the side door and the corresponding body structure supporting column. By stiffening the outer shell of the movable vehicle body part and with the simultaneously deformable design of the aligned outer shell of the at least one adjacent vehicle body section, a corresponding reverse deformability of the inner shell of the movable vehicle body part, and the resistance to deformation of the adjoining inner shell of the stationary vehicle body section, wedging of the adjacent faces of the vehicle body part and the vehicle body section, which hinders an opening of the vehicle body part, can not occur. On the contrary, the faces will rotate during deformation such that, in contrast to an originally right angle, an open angle is formed relative to the opening direction of the vehicle body part.

As a further feature of the invention, mutually adjacent joint sections of the at least one vehicle body part and of the stationary vehicle body sections are constructed to be resistant to deformation; these joint sections extend transversely to the impact load direction and, on the face-side, in each case, connect the outer shell and the inner shell with one another. It is thereby ensured that, in the event of a corresponding vehicle impact, these joint sections forming the faces are subjected to defined kinematics and reliably carry out the desired diagonal positioning and rotation on the basis of the different deformations of the outer and inner shell.

The resistance to deformation of the outer and inner shells can be achieved by various measures, particularly by increasing the wall thickness of the outer and inner shells, by the selection of a deformation-resistant material or by correspondingly connected or integrated reinforcing structures, reinforcing shells or reinforcing plates.

The deformability of the remaining inner and outer shells can be achieved analogously by a reduction of the wall thickness or by shaping, which is weakened at least in sections, in the form of desired buckling points, folding corrugations or similar devices or also by the selection of a suitable deformable material. In all cases, the term "deformability" refers to plastic deformability by which energy can also be reduced as a result of the deformation.

Additional advantages and characteristics of the invention are found in the claims as well as in the following description of a preferred embodiment of the invention which is illustrated by way of the drawings.

DESCRIPTION OF THE PREFERRED EMBODIMENTS

Figure 1:
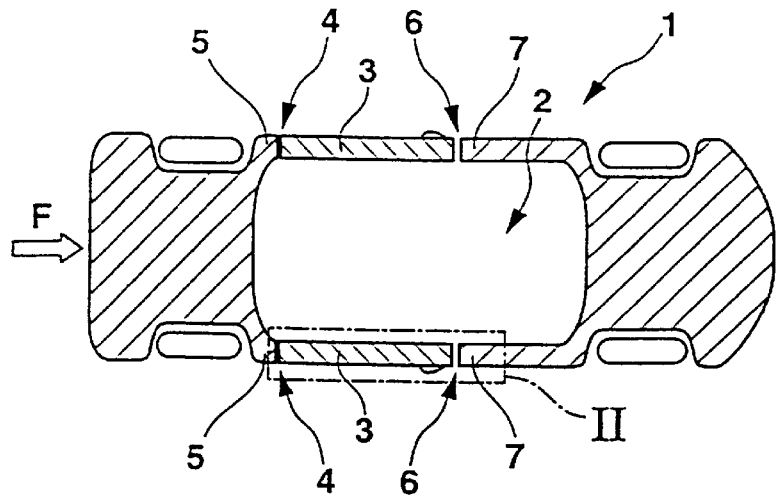
FIG. 1 is a schematic top view of an embodiment of a body structure of a two-door passenger car according to the invention.

FIG. 1 is a schematic view of a two-door coupe or convertible passenger car. However, the deformation behavior of the side doors of such a passenger car can be applied in the same manner to other motor vehicles with a self-supporting body structure.

Figure 2:
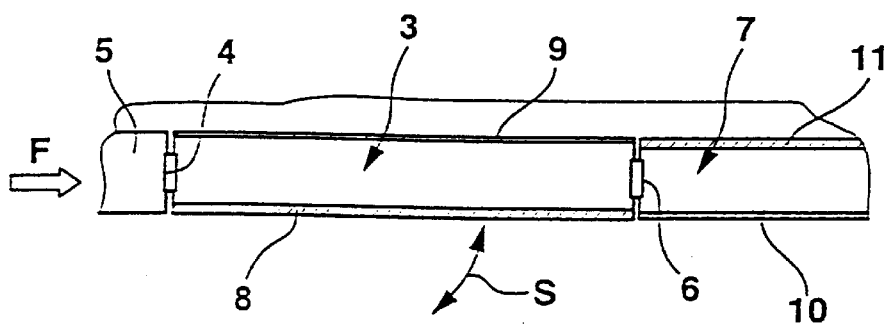
FIG. 2 is an enlarged representation of the cutout II of the body structure according to FIG. 1 in the undeformed operating condition.

The passenger car has a self-supporting body structure 1 which encloses an occupant compartment 2. In the area of the occupant compartment 2, the body structure 1 has one side door 3 on opposite respective sides, which side door 3, viewed in the longitudinal direction of the vehicle, is embedded between forward and rearward supporting columns 5, 7. In this case, each side door 3 is swivellably linked by a hinge arrangement 4 to the forward supporting column 5, which is also called an A-column. At another supporting column 7, which is rearward as viewed in the longitudinal direction of the vehicle and which is also called a B-column, each side door 3 is held in a basically known manner by a door lock 6 in its closed position. The mutually facing faces of the side door 3 and the B-column 7 forming a stationary vehicle body section extend approximately in parallel to one another and approximately transversely to the longitudinal direction of the vehicle (FIG. 2). These faces form joint sections between the side door 3 and the B-column 7 because, in the event of a frontal impact of the passenger car and a corresponding impact load in the direction of the arrow F, they come in contact with one another essentially in a flat manner. In order to avoid that difficulty in opening the side door 3 in the direction of the arrow S because of the impact load of such a frontal impact F, particularly in the event of a laterally offset frontal impact, the side door 3 being acted upon correspondingly intensively, a defined deformation behavior is assigned to each side door 3. This deformation behavior causes defined kinematics for the joint sections of the side door 3 and the B-column 7.

For this purpose, the side door 3, which, like the adjoining vehicle body sections 5, 7, has a two-shell design, has an outer shell 8 which is designed to be resistant to deformation, in contrast to an inner shell 9. Correspondingly inversely, the vehicle body section forming the B-column has a deformable outer shell 10 and a deformation-resistant inner shell 11, and the outer and inner shells 8, 10 and 9, 11 of the side door 3 and the vehicle body section 7 are in each case aligned with one another in the impact load direction F. In the illustrated embodiment, the deformation resistance of the outer shell 8 and of the inner shell 11 is achieved by increasing the wall thickness with respect to the wall thickness of the inner shell 9 and of the outer shell 10. In order to achieve, in the deformation behavior of the side door 3 and of the vehicle body section 7, a defined difference between the respective deformation-resistant shell and the opposite deformable inner shell, in the illustrated embodiment, the inner shell 9 is, in addition, provided in a deformation area 12 in a supplementary manner with weakening shapings in the form of desired buckling points or folding corrugations not shown in detail. In the same manner, the outer shell 10 has a correspondingly weakened shaping in a deformation area 13.

In the illustrated embodiment, the A-column 5, which forms the forward vehicle body section, has an identical design with respect to the outer and inner shells. Consequently, by way of the outer and inner shells of the A-column 5, identical forces are introduced into the outer shell 8 and the inner shell 9 of the side door. As a result, it is ensured that the operation of the hinge arrangement 4 is not impaired. Depending on the design of the hinge arrangement 4, however, in the A-column 5, the outer shell may be designed to be deformable and the inner shell may be designed to be deformation-resistant, because such a supplementary measure also results in an open diagonal position of the joint sections between the side door 3 and the A-column 5, which facilitates an opening of the side door 3.

Figure 3:
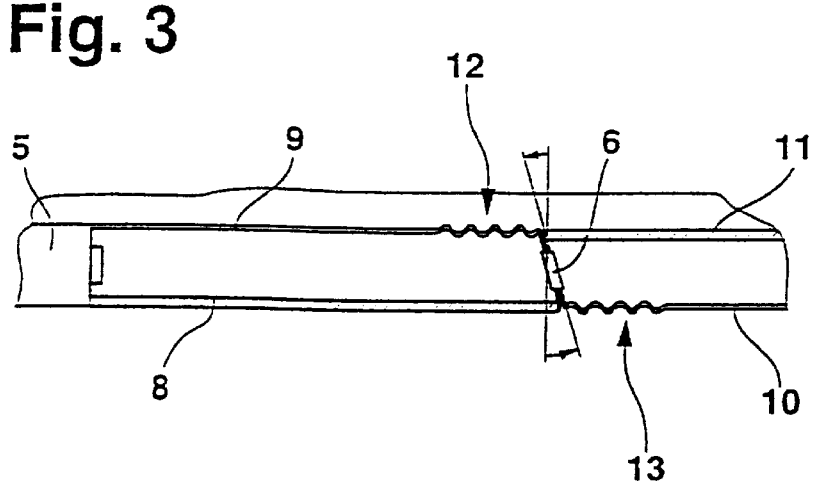
FIG. 3 is a view of the cutout of the body structure according to FIG. 2 in the deformed end condition.

As illustrated in FIG. 3, under corresponding loads in the direction of the arrow F because of a frontal impact, the deformation areas 12, 13 deform such that the inner shell 9 of the side door 3 and the outer shell 10 of the vehicle body section 7 are upset either only in the deformation areas 12, 13 or as a whole. The outer shell 8 of the side door 3 and the inner shell 11 of the vehicle body section 7 essentially retain their shape, so that rotation and diagonal positioning of the contact surface of the joint sections between the side door 3 and the vehicle body section 7 necessarily takes place according to the lines marked in a dash-dotted manner and by arrows. The rotation essentially takes place about a vertical axis which penetrates the door lock 6. A person skilled in the art understands that this defines only the basic course of rotations and axes. Deviations may occur in practice without leaving the functional principle. As illustrated in FIG. 3, the common contact surface of the joint section between the side door 3 and the vehicle body section 7 in the door lock area 6 rotates such that an open angle occurs relative to the longitudinal direction of the vehicle, which angle, in every case, avoids a form-locking wedging of the side door 3 and the vehicle body section 7 relative to the transverse direction of the vehicle. The same function as in the case of an increase of the wall thickness is provided for achieving a sufficient deformation resistance in that corresponding stiffening shells or plates are connected with the respective outer or inner shells in the manner of a material doubling or multiplication of material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Body structure for a motor vehicle comprising:
   at least one movable vehicle body part which is arranged along an impact load direction,
   stationary vehicle body sections which flank the movable vehicle body part approximately in alignment, in the impact load direction, in front of and behind the moveable body part,
   the at least one movable vehicle body part and the flanking stationary vehicle body sections each being constructed of an outer shell and an inner shell which are aligned in the impact load direction,
   wherein the outer shell of the movable body part is designed to be resistant to deformation and the inner shell of the movable body part is designed, at least in sections, to be more deformable in the impact load direction than said outer shell of the movable body part, and
   wherein, in at least one flanking vehicle body section, in a correspondingly inverse manner, the outer shell of the flanking body section is constructed to be more deformable at least in sections than the inner shell of the flanking body section.

2. Body structure according to claim 1, wherein the at least one vehicle body part and the stationary vehicle body sections have mutually adjacent joint sections which are constructed to be resistant to deformation, wherein said joint sections extend transversely to the impact load direction and, on face sides, in each case, connect the outer shell and the inner shell with one another.

3. Body structure according to claim 1, wherein the outer and inner shells are made deformation resistant by increasing the wall thickness.

4. Body structure according to claim 1, wherein the outer and inner shells are made deformation resistant by selection of a deformation-resistant material.

5. Body structure according to claim 1, wherein the outer and inner shells are provided with deformation resistance by stiffening shells or plates which are flatly connected with the outer and inner shells.

6. Body structure according to claim 1, wherein the outer and inner shells are provided with deformation resistance by a supporting-framework-type stiffening structure for a respective outer or inner shell.

7. Body structure according to claim 1, wherein deformability of the inner and outer shells is provided by a reduction of the wall thickness with respect to the deformation-resistant outer and inner shells.

8. Body structure according to claim 1, wherein deformability of the outer and inner shells is provided by a shaping which is weakened at least in sections.

9. Body structure according to claim 8, wherein the weakened sections are provided by desired buckling points.

10. Body structure according to claim 8, wherein the weakened sections are provided by folding corrugations.

11. Body structure according to claim 1, wherein deformability of the inner and outer shells is provided by selection of a material which can be plastically deformed in a suitable manner.

12. A process for producing a body structure for a motor vehicle including at least one movable vehicle body part, and stationary vehicle body sections which flank the movable vehicle body part approximately in alignment, in the impact load direction, in front of and behind the moveable body part, the movable vehicle body part and the flanking stationary vehicle body sections each being constructed of an outer shell and an inner shell which are aligned in the impact load direction, comprising:

designing the outer shell of the movable body part to be resistant to deformation, designing the inner shell of the movable body part, at least in sections, to be more deformable in the impact load direction than said outer shell, constructing the outer shell of at least one flanking vehicle body section to be deformable at least in sections, and constructing the inner shell of the at least one flanking vehicle body section to be more resistant to deformation than the outer shell of the at least one flanking vehicle body section.

13. A process according to claim 12, wherein the outer and inner shells are made deformation resistant by increasing the wall thickness.

14. A process according to claim 12, wherein the outer and inner shells are made deformation resistant by selection of a deformation-resistant material.

15. A process according to claim 12, wherein the outer and inner shells are made deformation resistant by stiffening shells of plates which are flatly connected with the outer and inner shells.

16. A process according to claim 12, wherein the outer and inner shells are made deformation resistant by a supporting-framework-type stiffening structure for a respective outer or inner shell.

17. A process according to claim 12, wherein the outer and inner shells are made deformation resistant by reducing the wall thickness with respect to the deformation-resistant outer and inner shells.

18. A process according to claim 12, and further comprising weakening a shaping at least in sections to provide deformability of the outer and inner shells.

19. A process according to claim 12, and further comprising selecting a material which can be plastically deformed in a suitable manner to provide deformability of the inner and outer shells.

* * * * *